United States Patent [19]

Taylor

[11] 3,958,978

[45] May 25, 1976

[54] PROCESS FOR COPPER METAL ORE REDUCTION

[76] Inventor: Paul Franklin Taylor, P.O. Box 468, Crossville, Tenn. 38555

[22] Filed: Sept. 3, 1974

[21] Appl. No.: 502,896

Related U.S. Application Data

[63] Continuation-in-part of Ser. No. 403,261, Oct. 3, 1973, Pat. No. 3,833,353, which is a continuation-in-part of Ser. No. 273,284, July 19, 1972, abandoned.

[52] U.S. Cl. .......................................... 75/21; 75/89
[51] Int. Cl.² .......................................... C21B 3/04
[58] Field of Search ..................... 75/1, 2, 6, 21, 26, 75/89; 252/61; 75/84

[56] References Cited
UNITED STATES PATENTS

| | | | |
|---|---|---|---|
| 2,697,660 | 12/1954 | Sibert | 75/121 |
| 2,822,240 | 2/1958 | Dunn et al. | 75/1 |
| 3,047,361 | 7/1962 | Hubbard et al. | 75/121 |
| 3,653,875 | 4/1972 | Waters et al. | 75/21 |
| 3,753,686 | 8/1973 | Wilder et al. | 75/21 |
| 3,784,593 | 1/1974 | Taylor | 75/84 |
| 3,791,815 | 2/1974 | Taylor | 75/84 |
| 3,811,871 | 5/1974 | Taylor | 75/84 |
| 3,833,353 | 9/1974 | Taylor | 75/21 |

*Primary Examiner*—Walter R. Satterfield

[57] ABSTRACT

Ores containing copper metal are reduced to the metal by mixing them with a carbonate catalyst, both being in the finely divided state, then mixing them with a chemical liquid solution comprised mainly of phosphoric acid, zinc oxide, and a sulfated surfactant which is in the concentrated state, or optionally water may be added, allowed to react chemically while stirring, then optionally boiled, then smelted at such temperatures as necessary to smelt (melt) the copper out of the mass (matrix).

7 Claims, No Drawings

PROCESS FOR COPPER METAL ORE REDUCTION

This application is a continuation-in-part of copending application Ser. No. 403,261, filed Oct. 3, 1973, now U.S. Pat. No. 3,833,353, which called out the metal Copper as one of the by-product metals of that reduction process for Noble (Class VIIIB) Metal ore reduction, and which was a continuation-in-part of an originally filed copending application Ser. No. 273,284, filed July 19, 1972, now abandoned, which called out the process as being viable for both Class IB and VIIIB Metal ore reduction, of which the metal Copper is a member, also called out Chalcopyrite as one of the ores being so reduced within that process for Copper production.

The present invention process relates to an improved method for separating chemically the metal Copper as found in certain copper-bearing ores from oxygen, sulfur, carbonates, and other chemicals and impurities found with such ores; more specifically known as the reduction of the oxides, carbonates, and sulfides in which the metal exists as a chemically-bound component; such separating herein known as PROCESS FOR COPPER METAL ORE REDUCTION.

Copper-bearing ores are found in nature as three distinct compounds which are oxides, carbonates, and sulfides. Ths sulfides contain iron. Minute traces of other metals usually exist in such ores such as gold and silver. Of the three types ore the sulfides are the most difficult to reduce for the contained copper. This is because the ore must first be oxidized for the removal of the iron sulfides, then the removal of the oxygen from the copper oxide so as to produce the metal. The final refining steps are the same for copper from all such ores after the reductions and consists of Fire Refining and Electrorefining. The oxide ore, Cuprite ($Cu_2O$), is reduced with carbon (coke) at high temperatures. The carbonate ores, Malachite ($Cu(OH)_2.CuCO_3$), and Azurite ($Cu(OH)_2.2CuCO_3$), are first heated so as to convert them to the oxides ($Cu_2O$), which are then reduced as is the ore, Cuprite. The major part of copper as produced within the United States is obtained from the sulfide ores known as Chalcopyrite ($Cu_2S.Fe_2S_3$). In converting them to the oxides, as above stated, oxygen and sand are added in order to remove the iron sulfides, so as to form sulfur dioxide and iron silicates. The ore requires three distinct steps for recovery of the copper (reduction), which begins with concentrating, then smelting, the converting, after which it is ready to be refined. Such steps are complicated, costly, and must be performed with exact precision in order for those processes to be effective for copper production.

In instant process all of the different types ore find common treatment for their reductions, with only slight modifications, in that all are subjected to a chemical liquid solution made up of the same components, to which water and carbonate catalysts may be added; such catalysts as may be derived from any of the metals of Classes IA and IIA of the Periodic Table of Elements, such as calcium carbonate. The ore enters the reduction in the finely divided state, as does the catalyst when used. This to insure that each particle of ore (molecular) is in contact with the liquid formula and catalyst for ideal reductions. The ore is in the concentrated form so that all gangue, rock, dirt, etc. is removed prior to it's entry into the reduction medium. As such the cuprite ($Cu_2O$) is so entered, the malachite and azurite carbonates, ($Cu(OH)_2.CuCO_3$) and ($Cu(OH)_2.2CuCO_3$), may be so entered either seperately or together, and the chalcopyrite ($Cu_2S.Fe_2S_3$) may be so entered. All such ores react chemically with the reduction components and emits heat (exothermic); the oxygen, sulfur, carbonate, and other impurities combine with the reduction components, thereby freeing the copper (reduction). The sulfide ore, being so reduced also frees the combined iron, which is smelted out of the matrix material after the copper is smelted out at lower temperatures. This provides for a usable by-product (iron) when utilizing these reduction methods upon the ore Chalcopyrite. Also, with such ore reductions the sulfur may be reclaimed as another by-product in the form of sulfur dioxide ($SO_2$), as released upon smelting out of the metals from the matrix material, and which goes into the known process for sulfuric acid ($H_2SO_4$) production. Such ores also contain trace metals which are reduced along with the iron and copper and are recovered upon subsequent smelting. These are usually gold and silver, and metals of the Platinum group.

Therefore, as starting materials for instant process powdered or pulverized copper ore is admixed with a certain liquid formula solution. Powdered or pulverized carbonate as derived from any of the metals of the Classes IA and IIA, such as calcium carbonate, may optionally be added to the mixture or to the ore before it (ore) enters into the solution. Water may also be optionally added to the mixture, or to the ore, or liquid solution, prior to their mixing.

The ore is; Cuprite ($Cu_2O$); Malachite ($Cu(OH)_2.CuCO_3$); Azurite ($Cu(OH)_2.2CuCO_3$) and Chalcopyrite ($Cu_2S.Fe_2S_3$)

The chemical liquid solution formula is of the following composition by weight ratio;

| | |
|---|---|
| Phosphoric acid | 24.20 lbs plus or minus 5.00 lbs |
| Zinc oxide | 0.50 lbs plus or minus 0.25 lbs |
| Sulfated surfactant | 1.00 lbs more or less |

The sulfated surfactant is a type of wetting agent and of composition alkylphenol polyglycol ether.

The catalyst carbonate (if added) should be commercially pure of at least 99%.

The water ($H_2O$) (if added) should be non-mineral or of a distilled quality, especially if added to the formula prior to mixing.

When the selected ore and other starting materials are mixed together within a common reduction container and heated with endothermic heat (when necessary), oxygen, sulfur, carbonates, and other chemicals and impurities are chemically released from the metals Copper, Iron, trace metals Gold and Silver, and chemically combines with the reduction components, thereby forming a matrix material from which those metals may be smelted (melted) out to either individual ingot, or matte-like alloy, according to the selection of the operator, and the applied heat.

It is, therefore, an object of the present invention process to provide another method for the production of Copper, with by-product metals Iron, Gold and Silver.

It is another object to provide a process viable for the production of these metals with utilization of the leading ores, Cuprite, Malachite, Azurite, and Chalcopyrite.

It is still another object to provide a more simple and economical method for producing these metals from such chemically-bound ore.

Other objects and advantages will become apparent from a further reading of the description and the appended claims.

With the above and other objects in view the present invention mainly comprises a process for separating Copper, Iron, Silver and Gold from chemically-combined oxygen, sulfur, carbonates, and other ore-combined impurities; featuring ease of reduction operations, economic advantages over present known processes, and utilization of the leading copper ores with common reduction basic elements.

The process begins with the stated mixing together of the starting materials within a non-corroding, heat-resisting, and otherwise suitable pot or vat reduction vessel, followed by stirring until the exothermic chemical reaction is completed. The vessel may then be heated (boiled) in cases where liquid may remain at the end of the reaction, or the contents may be transferred directly to a crucible for smelting in cases where all the liquid has been absorbed by the reaction. If boiled it continues until no liquid remains and residue has baked to a dry and solid state. Residue is then smelted for the production of the metals Copper, Iron, Silver and Gold.

Thus, it appears the basic requirements for performance of instant process suggests a plan of operation for production size batches; such that mixers of known technology (such as cement mixers) which may rotate laterally about their central axis and be tiltable on appropriate trunions would serve as the mixing chamber of instant process ingredients, with mixing terminating in a thick slurry which may then be poured within a fixed and tiltable crucible furnace in close proximity, which crucible is cooled sufficiently from previous operation so that mixture may be admitted within it and which may be tilted sufficiently after the smelting operation so as to emit the metals and slag.

With laboratory size operation a small iron skillet may serve as the mixing container, and then the mixed components transferred to an appropriate small crucible about 1 foot in height by about 6 inches wide, perhaps of silicon carbide fabrication and which conveniently fits within a small gas-fired furnace which may operate well in the range of 2400°F. Such an arrangement allows for easy and simple mixing and smelting in carrying out instant process for small amounts.

The Cuprite ore may enter the process as is, however, the operator may select to first heat the Malachite and Azurite carbonate ores so as to remove the carbon dioxide gases from them, but this is not a requirement of the process and may optionally be performed. Also, the Chalcopyrite ore may be roasted prior to entry into process for the removal of the sulfur in the form of sulfur dioxide gases, however this is not a requirement also of instant process, and may be performed optionally and at the convenience of the operator.

A definite part of the process is in adding amounts of water to either the formula solution, to the ore, or to the formula-ore mixture. This is a definite chemical aid to the reduction and appears to fulfill the requirement of oxygen for the metals to fully seperate from the other ore elements. In presently known technology that gas is blown through the conversion medium and definitely required. Ratios of water to solution and the ores are myriad and infinite.

For the above and exact same stated reasons the added compound, water, as herein defined, may be added to previous ore reduction processes which utilize the same and exact chemical formula solution components as herein defined; such solutions considered as being concentrated and found to be operational with added water for reduction effectiveness of the respective and varying ores so operated. Specifically those are; Process For Class VIIIB Metals Ore Reduction, Ser. No. 403,261, filed Oct. 3, 1973; Process For Class IVB Metals Ore Reduction Improvement, Ser. No. 471,803, filed May 20, 1974; Process For Class IVB Metals Ore Reduction Improvement, U.S. Pat. No. 3,784,593, filed Mar. 22, 1972; Process For Lanthanide and Actinide Metals Ore Reduction, U.S. Pat. No. 3,791,815, filed Dec. 13, 1972; and Process For Ilmenite Ore Reduction, Ser. No. 455,624, filed Mar. 28, 1974.

Also, for the above and exact same reasons the plus and minus values of the chemical formula solution, as herein defined, may be utitlized with previous ore reduction processes utilizing the same and exact chemical formula components as herein defined; such solutions considered as being concentrated and the processes operational also as instant process when those components of said solution are; Phosphoric acid, 24.20 lbs. plus or minus 5.00 lbs.; Zinc oxide, 0.50 lbs. plus or minus 0.25 lbs.; and Sulfated surfactant 1.00 lbs. more or less. Specifically those are; Process For Class VIIIB Metals Ore Reduction, Ser. No. 403,261, filed Oct. 3, 1973; Process For Class IVB Metals Ore Reduction Improvement, Ser. No. 471,803, filed May 20, 1974; Process For Class IVB Metals Ore Reduction Improvement, U.S. Pat. No. 3,784,593, filed Mar. 22, 1972; Process For Lanthanide and Actinide Metals Ore Reduction, U.S. Pat. No. 3,791,815, filed Dec. 13, 1972. Now pending application titled Process For Ilmenite Ore Reduction, Ser. No. 455,624, filed Mar. 28, 1974, states forth and claims the solution formula components as in instant application specification and claims (same components, same amounts by weight, and same plus and minus amounts by weight). Solution component amounts within those other previous applications and patents are considered as being stoiciometrically adjusted, however, it is found the processes are operational when such solution components vary (plus-minus values).

Also, for the above and exact same reasons the carbonate catalysts utilized, as herein defined, may be operated with previous ore reduction processes utilizing the compound, Calcium Carbonate, which is a member of the Classes IA and IIA Metals of the Periodic Table of Elements, as herein specified. Specifically those are; Process For Class VIIIB Metals Ore Reduction, Ser. No. 403,261, filed Oct. 3, 1973; Process For Class IVB Metals Ore Reduction Improvement, Ser. No. 471,803, filed May 20, 1974; Process For Class IVB Metals Ore Reduction Improvement, U.S. Pat. No. 3,784,593, filed Mar. 22, 1972; Process For Lanthanide and Actinide Metals Ore Reduction, U.S. Pat. No. 3,791,815, filed Dec. 13, 1972. Now pending application titled Process For Ilmenite Ore Reduction, Ser. No. 355,624, filed Mar. 28, 1974, states forth and claims the carbonate catalysts as in instant application specification and claims (same carbonates as formed by metals of the Classes IA and IIa Series of the Periodic Table of Elements).

Also, instant process may be operated without usage of catalysts comprised of any of the carbonates as formed from the metals of Class IA and IIA Series of the Periodic Table of Elements. The process operates without such catalysts. It does operate better by using one of them, but it is not a definite requirement for the operation. Also, certain previous ore reduction processes utilizing such carbonates for their operation may be operated without them to some degree of efficiency. Specifically those are; Process For Class VIIIB Metals Ore Reduction, Ser. No. 403,261, filed Oct. 3, 1973.

Instant process does not require the boiling step at times for the reductions. In the case of Cuprite ore ($Cu_2O$) an equal volume of the solution formula will digest a like volume of that ore into a chunk like mass. It may then be directly placed within the smelting medium for smelting out the copper. On the other hand should it require two volumes of the solution formula to one volume of the ore (to be stoiciometrically correct) then the mixture would be a slurry obviously requiring boiling in order to both finish the reduction by heating as well as boil out the excess liquid. This same fact holds true with the ores Malachite, Azurite, and Chalcopyrite, and depends on whether the specific ores are sufficiently concentrated with regard to metal percentage per unit weight of ore, as greater amounts of formula solution are required with higher metal percentage concentrations, and lesser with lower metal percentage concentrations; in all cases the understanding that the ores are chemically combined with regard to the included metals.

When smelting the temperatures operate at approximately the above stated 2400°F. for the production of Copper, gold and silver. Carbon (coke) may be added to aid in the smelting. Also, a hydroxide, of one of the Alkali Metals as included within the Classes IA and IIA of the Periodic Table of Elements, may be added to aid in the smelting. This is best utilized with the hydroxide of sodium (NaOH).

Additions of limestone ($CaCO_3$, calcium carbonate) during the smelting has proved to be a detriment to the smelting and is not recommended.

Subsequent refining of copper produced from instant process may be subjected to known and standard operational operations as heretofore defined, however, this is optional and as the operator may desire. It is noted instant process produces high degree of copper purity with usage of sodium hydroxide within the smelting crucible during the operation.

Also, when sodium hydroxide is utilized for the final step of smelting for the production of copper from instant reduction process the matrix material combines with the hydroxide to better free the metals, and, in so doing it forms a sodium phosphate material, which may be treated by known and standard methods for phosphoric acid production as a by-product, thereby causing instant process to be even more economically viable for operation.

Thus, the main effort with instant process in copper production also provides by-products of iron, gold, silver, sulfur dioxide for sulphuric acid production, and finally phosphorus for phosphoric acid production. This, plus the viability of the process for all the leading copper-bearing ores found in nature makes for a very attractive and economically feasible copper-producing process operation.

Gases being emitted from instant process mainly include zinc oxide in very small amounts, carbon monoxide in small amounts, carbon dioxide, carbon in very small amounts, water vapor, and sulfur dioxide. With the recovery of the sulfur dioxide the other gases present no undue problems and may be easily controlled by known and standard anti-pollutant technology and devices. Also, such reductions present no undue health hazards with normal air make-up installations, exhaust equipment, etc. When the smelting is performed with the aid of sodium hydroxide sodium oxide is emitted, but neither does this present health or pollutant problems with normal equipment control.

OPERATIONAL EXAMPLE 1

The operation utilizing instant process for Copper Metal Ore Reduction as derived from the foregoing specification may be exemplified more specifically and particularly by an explanation for the reduction of a 16 ounce (av.) volume of Cuprite concentrated copper ore of the chemistry $Cu_2O$, which the inventor has successfully performed. Such ore is in finely divided form of approximate $-100$ to $-325$ mesh grade particulate size and regarded as a normal cross-sectional sample from such ore as has been concentrated by known and standard methods, and which is dry.

The reduction equipment consists of the following: An iron container of approximately one-half gallon volume size; stainless steel stirring rod; a silicon-carbide crucible approximately 12 inches in height and 6 inches in width; a gas-fired furnace of the approximate inside dimensions suitable to accept the crucible.

Introduced within the iron container is the 16 ounces (av.) of the Cuprite oxide ore.

To the ore is added powdered limestone ($CaCO_3$) in finely divided form of approximately $-100$ to $-325$ mesh grade particulate size, such material being dry and of a commercially pure grade of better than 99%. Approximately 1 ounce (av.) is added. This amount may vary (for example 1 ounce plus or minus 1 ounce), or none at all. It is stirred and well mixed with the ore.

To the mixture of ore and limestone is added about 16 ounces (av.) of liquid chemical formula solution, such solution being comprised of ingredients as described in the above specification, and to which approximately 16 ounces (av.) of water ($H_2O$) of non-mineral or distilled quality has been added and mixed well. This could be more or even no water at all (such as plus or minus 16 ounces), and it could be added indipendently to the ore and limestone first before the adding of the chemical formula solution, or immediately after the solution is added to the ore and limestone. The ore, limestone, solution formula, and water are stirred well to evenly distribute all of the ingredients so that a good homogeneous mixture results. Heat will evolve at this time from the mixture (exothermic) with the ensuing reaction. The container is then heated over a hot plate or flame so as to remove all the excess liquid should there by any left over after the reaction has ceased. A vent should be provided so as to exit the gases from the presence of the operator. The endothermic heating continues until residue is thoroughly reduced and is baked to a dry and solid state. During heating the mixture is stirred as often as necessary so as to maintain mixture homogeneity.

Upon termination of heating the residue matrix material is allowed to sufficiently cool and is then removed from container in appropriately pulverized form for entry into the smelting crucible.

The pre-heated gas furnace may then be opened from the top and the silicon-carbide crucible with the matrix material inside inserted within it. The furnace is then again closed and the gas and blower turned back on and the temperature brought up to approximately 2400°F. When ingredients (matrix) inside the crucible has melted some carbon in the form of coke (or other) may or may not be added as the operator desires. When added it is approximately one-half pound (coke or coal). When carbon has burned and with matrix still molten sodium hydroxide may or may not be added (or some other of the hydroxides as formed by the Classes IA and IIA Metal Series of the Periodic Table of Elements) in the amount approximately one-half pound (8 ounces av. approximately) plus or minus one-half pound (8 ounces av.). After approximately 10 to 15 minutes of continued furnace operation furnace is shut off and crucible immediately removed and contents poured out. Copper as reduced will result. The ideal copper reduction (recovery) is by usage of water and limestone in the mixed ingredients, and carbon (coke or coal), and sodium hydroxide added to the smelting crucible during the smelting operation. Copper may then be transported to known and standard refining operations should that be the requirement and desire of the operator, or the copper may be utilized commercially as is.

The above example weight ratios present a norm in the reduction of Cuprite copper ore and is not intended to mean or be defined and deduced that the reduction effectiveness for that metal per instant process is necessarily confined to either exact or definite ratios, either by weight or volumetric measurement, as varying mesh size ore and limestone changes their weights while their volumes remain constant. Neither can the liquid formula solution or water be confined to such ratio unrealities.

Should the desire be to recover the phosphorus from the slag left-over residue for the manufacture of phosphoric acid (or other) it may be accomplished by known and standard methods for such phosphorus production from Sodium Phosphate, as the left-over material is largely of that composition.

OPERATIONAL EXAMPLE 2

The operation utilizing instant process for Copper Metal Ore Reduction as derived from the foregoing specification may be exemplified more specifically and particularly by an explanation for the reduction of a 16 ounce (av.) volume of Malachite and Azurite concentrated copper ore of the chemistry $Cu(OH)_2.CuCO_3$ and $Cu(OH)_2.2CuCO_3$. Such ore is in finely divided form of approximate −100 to −325 mesh grade particulate size and regarded as a normal cross-sectional sample from such ore as has been concentrated by known and standard methods, and which is dry.

The reduction equipment consists of the exact same items as are required in operating Example 1 above.

Introduced within the iron container is the 16 ounces (av.) of either the Malachite ore exclusive, the Azurite ore exclusive, or any ratio mixture of the two ores together, which may optionally be stirred and mixed together so that they are homogeneous and blended. Optionally the ore may be first heated within the iron container so as to remove some of the carbon dioxide ($CO_2$) from it, however, this is not a requirement for successful operation of instant process for copper production.

To the ore is added powdered limestone ($CaCO_3$) of the same type and quality as utilized within Example 1 above, and in the same amounts as that example with plus or minus quantities, or none at all. It is stirred and well mixed with the ore.

The adding of the liquid chemical formula solution, and the amount, with water (perhaps), and the remainder of the entire operation with the smelting, and adding of ingredients carbon (coke or coal), and sodium hydroxide (perhaps), is conducted exactly as is Example 1 above for copper production. The ideal copper reduction (recovery) with these two types of ore is by usage of water and limestone in the mixed ingredients, and carbon (coke or coal), and sodium hydroxide added to the smelting crucible during the smelting operation, as in Example 1 above for Cuprite ore reduction. The copper recovered may then be transported to known and standard refining operations should that be the requirement and desire of the operator, or the copper may be utilized commercially as is as in Ecample 1.

As in Example 1 for Cuprite ore reduction so also in Example 2 for Malachite and Azurite ore reduction; the weight ratios present a norm in the operations for these ores and is not intended to mean or be defined and deduced that the reduction effectiviness for that metal per instant process is necessarily confined to either exact or definite ratios, either by weight or volumetric measurement, as varying mesh size ore and limestone changes their weights while their volumes remain constant. Neither can the liquid formula solution or water be confined to such ratio unrealities.

As also in Example 1 for Cuprite ore reduction so also in this second example for Malachite and Azurite ore reduction; if the desire is for the recovery of the phosphorus from the slag left-over residue for the manufacture of phosphoric acid (or other) it may be accomplished by known and standard methods for such phosphorus production from Sodium Phosphate, as the left-over material is of that composition.

OPERATIONAL EXAMPLE 3

The operation utilizing instant process for Copper Metal Ore Reduction as derived from the foregoing specification may be exemplified more specifically and particularly by an explanation for the reduction of a 16 ounce (av.) volume of Chalcopyrite concentrated copper ore of the chemistry $Cu_2S.Fe_2S_3$. Such ore is in finely divided form of approximate −100 to −325 mesh grade particulate size and regarded as a normal cross-sectional sample from such ore as has been concentrated by known and standard methods, and which is dry.

The reduction equipment consists of the exact same items as are required in operating Examples 1 and 2 above.

While the ore of Example 1 contains approximately 88 percent copper by weight, and the Malachite and Azurite ores of Example 2 contain approximately 57 percent copper by weight, the Chalcopyrite of this Example 3 contains only approximately 33 percent copper by weight. Thus, with regard to the economical copper extraction (reduction) of this ore one is prompted to remove the gangue from the mined lode to the greatest possible concentrated form, also with removal of as much as possible the contained sulfur content prior to entry into the process, so instant reduction process ingredients may be economically expended in releasing metals from the ore instead of wasted. Consequently it is most advisable to first roast the highly concentrated ore at approximately 1200°F. so as to remove the sulfur in the form of sulfur dioxide, for usage within the manufacture of Sulfuric Acid. Approximately one-half the sulfur emits with such roasting from the molecular combined sulfur total. Thus, in instant process Example enough of the concentrate is roasted so that approximately 16 ounces (av.) are recovered partially freed from the sulfur for entry into the process. Either the roasted or non-roasted form of the concentrate may enter the process as the operator may choose. As per the economics of the operation the latter appears more advisable, and consequently it is so entered in instant Example; such contents being deposited within the iron container as the first step of instant process for reduction of Chalcopyrite ore.

To the ore is added powdered limestone ($CaCO_3$) of the same type and quality as that utilized within Example 1 above, and in the same amounts as that example with plus or minus quantities, or none at all. It is stirred and will mixed with the ore.

The adding of the liquid chemical formula solution in the same amount, and with or without water in varying amounts, are as that also utilized within Example 1 above, as is the subsequent smelting with or without the usage of the ingredients carbon (coke or coal), and sodium hydroxide. The ideal copper reduction (recovery) with this type ore is by usage of water and limestone in the mixed ingredients, and carbon (coke or coal), and sodium hydroxide added to the smelting crucible during the smelting operation, as in Example 1 above for Cuprite ore reduction. The copper and by-product metals (gold, silver, and perhaps traces of the Platinum metal series) may then be transported within the common matte-like alloy to known and standard refining operations should that be the desire and requirement of the operator.

The slag matrix material containing the iron is then transported to other known and standard smelting operations where higher temperatures are necessary for the smelting out of the iron as a usable by-product metal with any of the trace Platinum metals which melt at higher temperatures than 2400°F. wherein the copper metal is smelted out.

As also in Example 1 for Cuprite ore reduction, so also in this third example for Chalcopyrite ore reduction; if the desire is for the recovery of the phosphorus from the slag left-over residue for the manufacture of phosphoric acid (or other) it may be accomplished by known and standard methods for such phosphorus production from Sodium Phosphate, as the left-over material is of that composition.

The instant process is related to several of applicant's copending applications, which have heretofore been named within the above specification. Another, not so named, being the forerunner of all, titled Process for Class IV-B Metals Ore Reduction, now patented, U.S. Pat. No. 3,811,871, filed Feb. 19, 1971, to which attention is specifically drawn, as chemical discussions presented within that patent relates to like chemical cooperation of instant application, and is a factual representation of such chemical cooperation relative to all metals included in and claimed within instant application, as well as to all others included and claimed within herein stated relative and supportive applications, and is intended for teaching of chemical-ore cooperation inherent within such processes.

What is claimed as new and desired to be secured by Letters Patent is:

1. A method of reducing cuprite metal ore oxides, malachite, azurite, and chalcopyrite, or mixtures thereof comprising the steps of: (a) Admixing finely divided ores selected from the group consisting of cuprite, malachite, azurite, and chalcopyrite to a liquid chemical solution consisting essentially of about 24.2 parts by weight of phosphoric acid, about 0.5 parts by weight of zinc oxide, and about 1.0 part by weight of a sulfated surfactant, (b) stirring to aid chemical reaction and maintain mixture homogeneity, (c) heating mixture to vaporize the volatile materials until residue is baked to a dry solid state, and (d) heating residue sufficiently so as to (smelt) melt out copper, iron, gold, silver, and members of the platinum group, or mixtures thereof.

2. The process of claim 1 wherein the starting ore is preheated to volatize combined components of ore.

3. The process of claim 1 wherein water ($H_2O$) is added to reduction and ore elements so as to aid chemical reactions of those elements.

4. The process of claim 1 wherein limestone (calcium carbonate, $CaCO_3$), and that (carbonates) as derived from other metals of the groups of classes IA and IIA of the periodic table of elements, is the carbonate material as added to the ores in the ratio of about one weight unit of carbonate to about 16 weight units of ore.

5. The process of claim 1 wherein sodium hydroxide (NaOH), and that (hydroxides) as derived from other metals of the groups of classes IA and IIA of the periodic table of elements, is the hydroxide material as added to the (smelting) melting operation within the midst of the residue matrix material.

6. The process of claim 1 wherein carbon is added to the (smelting) melting operation within the midst of the residue matrix material.

7. The process of claim 1 wherein the sulfated surfactant is an alkylphenol polyglycol ether.

* * * * *